Nov. 26, 1968    F. H. GARDNER ET AL    3,413,438
SOLID STATE TEMPERATURE CONTROL CIRCUIT
Filed Aug. 3, 1966    2 Sheets-Sheet 1

*INVENTORS.*
FREDERICK H. GARDNER
FERENC PANKOTAY
BY
*Hoffman Stone*
ATTORNEY

INVENTORS.
FREDERICK H. GARDNER
FERENC PANKOTAY
BY
Hoffman Stone
ATTORNEY

United States Patent Office 3,413,438
Patented Nov. 26, 1968

3,413,438
SOLID STATE TEMPERATURE
CONTROL CIRCUIT
Frederick H. Gardner and Ferenc Pankotay, Rochester,
N.Y., assignors to Stromberg-Carlson Corporation,
Rochester, N.Y., a corporation of Delaware
Filed Aug. 3, 1966, Ser. No. 569,984
2 Claims. (Cl. 219—210)

ABSTRACT OF THE DISCLOSURE

A heating and temperature regulating circuit for a crystal oven. A transistor is the main heat source and is controlled by a thermally responsive amplifier. A feed-back circuit is connected between the transistor and the amplifier for limiting current applied to the transistor especially during warm-up. The feed-back path includes a diode polarized in the forward direction to reduce low level feed-back and permit strong response to high level feed-back.

---

This invention relates to a novel temperature control circuit of the type especially suited for use in a compact oven for regulating the temperature of an electrical component such as, for example, a piezoelectric crystal or a semiconductive device.

Temperature stabilized ovens are used quite widely in regulating the temperatures of electrical components such as crystal diodes, piezoelectric crystals and transistors to assure precision operation of such devices. In many instances, the accuracy of the temperature controlled component is a direct function of the degree of temperature stability which is maintained by the oven. It is therefore desirable to have a temperature stabilized oven which maintains the desired temperature within very close tolerances. At the same time it is important, especially in military applications, that the oven be rugged and have a high degree of reliability over long periods of operation.

Many prior circuits now in use are of the simple ON-OFF type. Certain others have the advantage of continuously variable control so that as the temperature within the oven approaches the desired operating point, heat dissipation is gradually increased or decreased toward a fairly close approximation of the amount needed for maintaining the proper temperature. There is less overshoot with this type of arrangement.

The present invention relates to a novel circuit of the latter type, of relatively simple and inexpensive construction, yet capable of very precise temperature regulation over a wide range of ambient temperatures.

Briefly, the invention contemplates the use of a semiconductor device such as, for example, a transistor, or a Zener diode as the heat source in an oven, and regulating the dissipation of the semiconductor device responsively to a heat sensor such as, for example, a thermistor. A special feature of the presently preferred embodiment of the invention relates to a feed-back arrangement whereby during initial warm-up of the oven, the main heat producing semiconductor device is not turned fully ON, but instead is controlled so that it dissipates power at a rate safely within its operational capability. The feed-back arrangement avoids the need to provide an auxiliary limiting resistor, which is otherwise needed and must be of relatively large power dissipating capacity.

Representative embodiments of the invention will now be described in detail in connection with the accompanying drawings, wherein.

Figure 1:
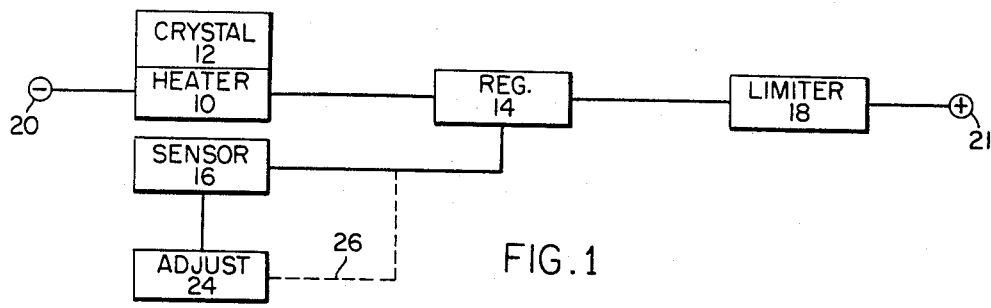
FIGURE 1 is a block diagram illustrating the general scheme of the circuits of the invention.

The block diagram of FIGURE 1 illustrates the general scheme of the circuits of the invention. In general, a semiconductor device 10 is mounted inside the oven (not shown) closely coupled thermally to the device to be controlled such as the piezoelectric crystal 12 indicated. Current through the semiconductor device 10 is controlled by a regulator circuit portion 14 responsively to a heat sensor 16, and a limiter device 18 is arranged to provide overload protection for the semiconductor device 10 during initial warm-up periods. Preferably, a manually operatable adjustment device 24 is included in the circuit for adjusting the temperature at which the crystal 12 is maintained. As indicated by the dashed line 26, the adjustment may, alternatively, be associated either with the sensor 16 or with the regulator circuit portion 14, or with both.

Figure 2:
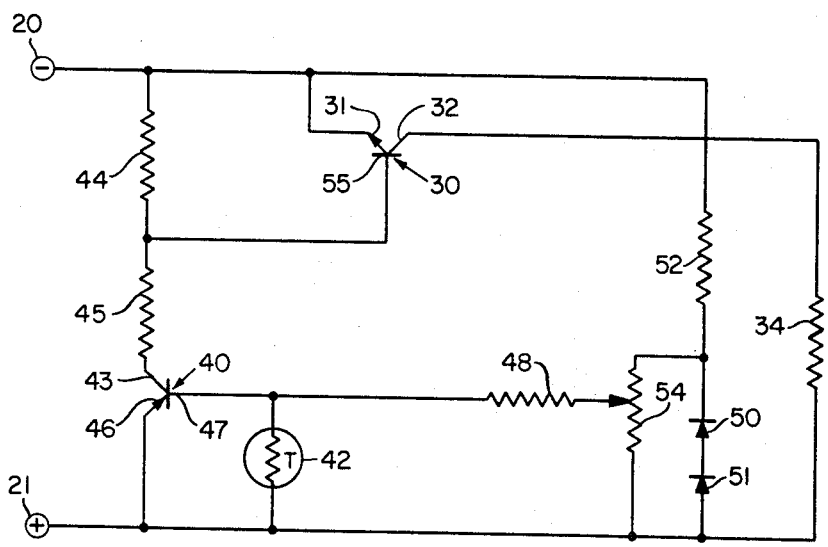
FIGURE 2 is a schematic circuit diagram of a control circuit according to a first embodiment of the invention.

A circuit according to a first embodiment of the invention, as shown in FIGURE 2, includes an NPN transistor 30 as the primary heat source in the oven. The emitter 31 of the transistor is connected directly to the negative terminal 20 of a D.C. power source. Its collector 32 is connected through a limiting resistor 34, which is of substantial power dissipating capacity, to the positive terminal 21 of the source. During the initial warm-up period of the oven, the transistor 30 is biased to saturation, and the current through it is limited solely by the source and the limiting resistor 34. To minimize warm-up time, it is desirable to place the limiting resistor either inside, or in close thermal relationship with the oven so that the heat produced in it will also contribute to warming of the oven.

As the oven approaches its desired operating temperature range, the current through the transistor 30 comes under control of a PNP transistor 40, called the regulating transistor, responsively to changes in the resistance of a thermistor 42, which is also mounted in the oven and closely coupled thermally to the device, the temperature of which is to be regulated. The collector 43 of the regulating transistor is connected through a pair of voltage dividing resistors 44 and 45, respectively, to the negative power terminal 20, and through the resistor 45 to the base of the heat producing transistor 30. Its emitter 46 is connected directly to the positive terminal 21 of the source. The base 47 of the regulating transistor is connected to the junction point between the thermistor 42 and a resistor 48, which together form a voltage dividing network across a source of standard reference voltage. The standard reference voltage is produced by a pair of series connected diodes 50 and 51 of known type, which are connected in their forward direction in series with a limiting resistor 52 directly across the source terminals 20 and 21. The voltage developed across the diodes 50 and 51 is applied across a variable voltage divider 54, the adjustable slide of which is connected to the resistor 48 in series with the thermistor 42. Adjustment of the variable divider 54 allows variation in the operating temperature of the oven.

In operation, as the oven temperature approaches its desired operating value, the resistance of the thermistor 42 decreases so that a relatively larger portion of the reference voltage taken from the variable divider 54 appears across the resistor 48 and a relatively smaller portion appears across the thermistor 42. The thermistor 42 is connected directly between the base 47 and emitter 46 of the regulating transistor. Reduction in the voltage drop across the thermistor 42 serves to reduce the forward bias on the regulating transistor 40, thereby to drive its collector 43 and the base 55 of the heat producing NPN transistor 30 more negative.

As the temperature further increases, this action continues until such time as the main transistor 30 is driven to cut-off. When the oven temperature thereafter falls, the action is reversed, and the main transistor 30 begins to conduct again.

Figure 3:
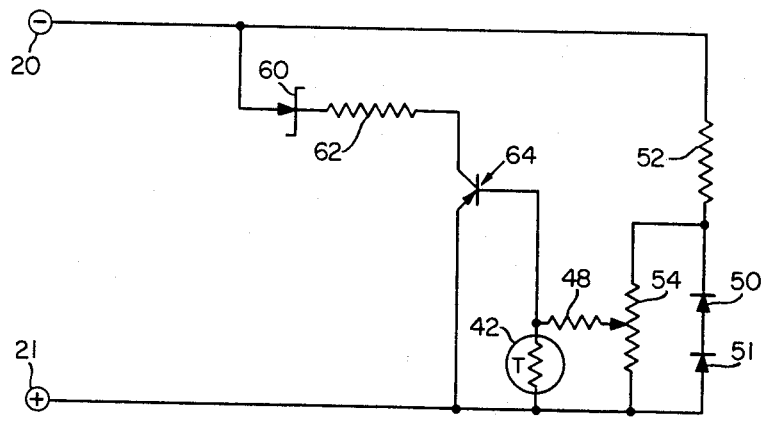
FIGURE 3 is a schematic circuit diagram of a control circuit according to a second embodiment of the invention.

In the embodiment illustrated in FIGURE 3, a Zener diode 60 is used as the main heat source for the oven in place of the transistor 30 shown in FIGURE 2. The Zener diode 60 is connected between the terminals 20 and 21 of the power source in series with a limiting resistor 62 and the collector-to-emitter circuit of a regulating transistor 64. The operation of the regulating transistor 64 is exactly identical to the operation of the regulating transistor 40 shown in FIGURE 2. It controls the amount of current flowing through the Zener diode 60 during times when the oven to be controlled is relatively close to the temperature desired for regulation. During the initial warm-up, the regulating transistor 64 is ordinarily biased to saturation, and the current through both it and the Zener diode is limited primarily by the limiting resistor 62. The Zener diode is connected for conduction in its back direction, and normally, it will be operated along the steep rise of its operating characteristic curve. A very large portion of the voltage from the power source appears across the Zener diode 60, and only a small portion across the limiting resistor 62 and the collector and emitter terminals of the regulating transistor 64. The Zener diode 60 is the major power dissipating element in the circuit, and the current through it varies very sensitively in response to changes in the regulating transistor 64.

Figure 4:
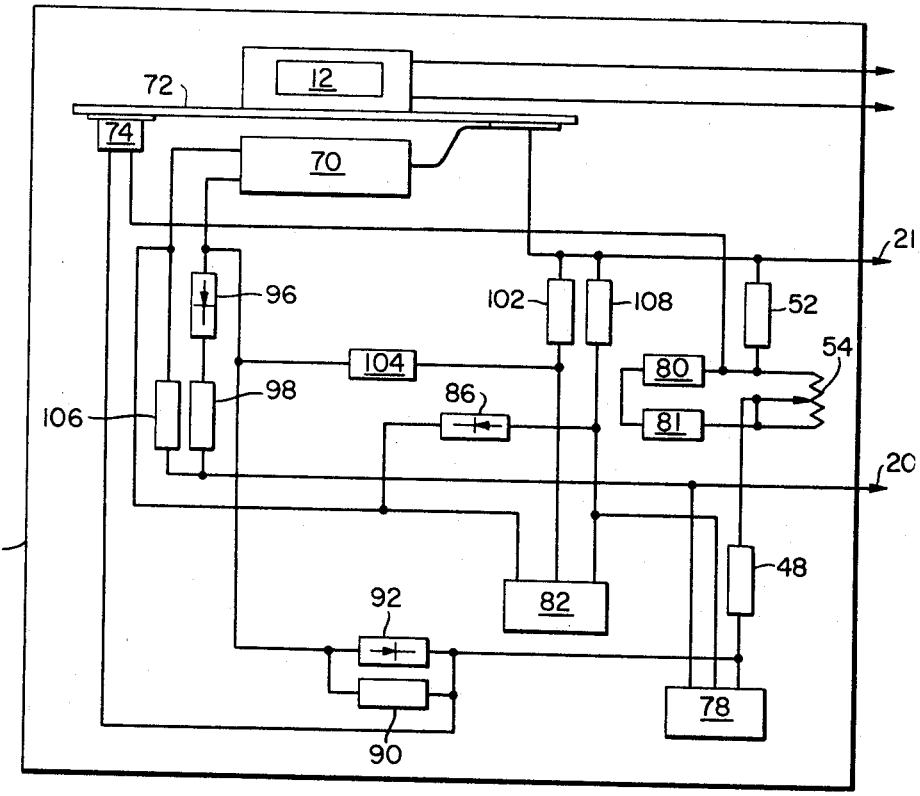
FIGURE 4 is a lay-out diagram, in somewhat schematic form of a circuit arrangement according to a third, and presently preferred embodiment of the invention as arranged in an oven.
Figure 5:
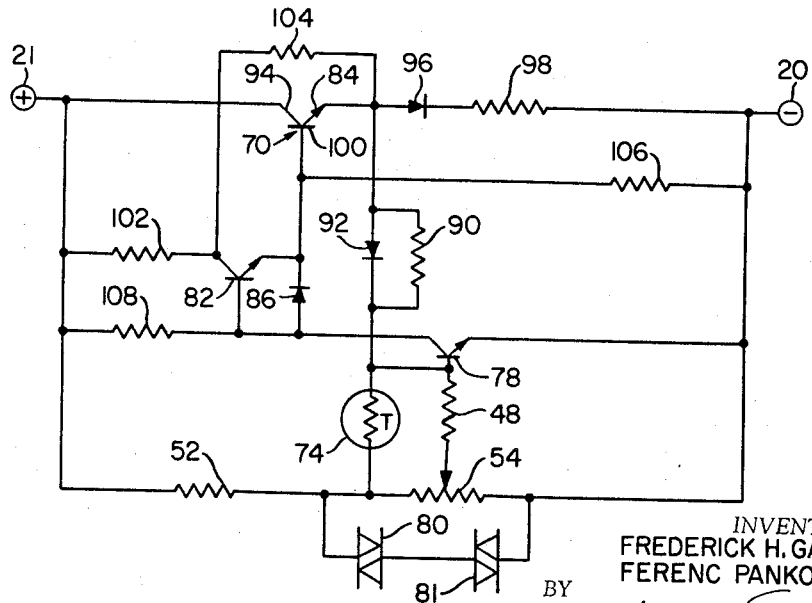
FIGURE 5 is a schematic circuit diagram of the circuit arrangement shown in FIGURE 4.

In the preferred form of the invention, as shown in FIGURES 4 and 5, a feed-back connection is provided between the main heating device and the regulating device for limiting the current through the main heating device during the initial warm-up period. This feed-back arrangement takes the place of the relatively large limiting resistors 34 and 62, respectively, of the embodiments shown in FIGURES 2 and 3, and enables the achievement of a relatively more compact and less expensive circuit construction. In the usual case, the size of the oven is limited by extrinsic considerations, and it is not usually possible to fit the limiting resistor inside it along with the other circuit components. Moreover, with respect to the embodiment shown in FIGURE 2, during the initial warm-up periods, the main heating transistor 30 is biased to saturation and presents relatively little resistance to the flow of current, so that its heat dissipation is not as great as one would like. By contrast, in the presently preferred embodiment, as shown in FIGURES 4 and 5, during the initial warm-up period, the feed-back arrangement operates to bias the main heating transistor to the point where it offers substantial resistance to the flow of current and dissipates heat at a rate reasonably close to its maximum capability.

The main transistor 70, the crystal 12, and the thermistor are all mounted upon and closely coupled thermally to a heat conductive plate 72, which may be, for example, of copper. The entire circuit is all contained within the oven, which is indicated by the box outline 76. In this case, the regulating transistor 78 operates in the first instance in exactly the same manner as the regulating transistors 40 and 64 hereinabove described, except that a pair of varistors 80 and 81 are used for producing the constant reference voltage.

The output of the regulating transistor 78 is amplified by a second transistor 82, and applied to the base of the main heat transistor 70. A temperature compensating diode 86 is preferably connected across the emitter and base terminals of the amplifying transistor 82 for maximum precision of control.

The feed-back portion of the circuit includes a resistor 90 connected in parallel with a diode 92 between the emitter 84 of the main transistor and the base of the regulating transistor 78. The resistor 90 provides a negative feed-back effect at all times. The diode 92 comes into play only at times when the oven temperature is substantially below the point for which it is regulated, at which times the voltage across the diode 92 exceeds its forward breakdown voltage. During normal operation, the feed-back voltage appearing across the resistor 90 and the diode 92 is relatively small and does not exceed the forward breakdown voltage of the diode.

The main transistor 70 is of the NPN type. Its collector 94 is connected directly to the positive terminal 21 of the power source. Its emitter 84 is connected to the negative terminal 20 through a biasing diode 96 and a limiting resistor 98 of relatively low value and small power dissipation capacity. The diode 96 is connected for conduction in its forward direction and serves to create a small bias voltage for the transistor 70, thereby allowing the use of a power supply of greater voltage output than would otherwise be possible. The base 100 of the main transistor is connected directly to the emitter of the amplifier transistor 82. The collector of the amplifier transistor 82 is connected through a load resistor 102 to the positive terminal of the power supply. Current for the biasing diode 96 is drawn through the load resistor 102 and a resistor 104 which are in series between the positive terminal 21 and the anode of the diode 96. The emitter of the amplifier transistor 82 is connected directly to the base 100 of the main transistor, and through a resistor 106 to the negative terminal 20 of the power source.

The emitter of the regulating transistor 78 is connected directly to the negative terminal 20 of the power supply. The collector of the regulating transistor 78 is connected directly to the base of the amplifying transistor 82, and through a load resistor 108 to the positive terminal of the supply.

At the beginning of an initial warm-up period, the thermistor 74 is cold. It has a relatively high resistance, and a relatively large portion of the voltage from the variable voltage divider appears across it. The voltage at the base of the control transistor 78, therefore, is driven toward its maximum negative value by the action of the thermistor 74 and the dividing resistor 48. This tends to cut off the control transistor 78, driving its collector, and the base of the amplifying transistor positive, and driving the amplifying transistor 82 toward saturation. As the amplifying transistor 82 is driven toward increased conduction, its emitter becomes increasingly positive, thus driving the base 100 of the heat transistor in the positive direction to turn the heat transistor ON. As the heat transistor starts to conduct, the voltage developed across its emitter resistor 98 increases and the emitter becomes increasingly positive. The emitter voltage is applied through the feed-back resistor 90 and the diode 92 to the base of the regulating transistor 78, turning it ON when the current through the heat transitsor 70 reaches a value safely below the maximum capability of the transistor 70. As the control transistor 78 comes ON, the potentials at the bases of the amplifying transistor 82 and the heat transistor 70 are reduced, thereby limiting the current through the heat transistor 70.

We claim:

1. A heating and temperature regulating circuit for use in an oven for heating and regulating the temperature of an electrical circuit component or the like, said circuit comprising a modulatable semiconductor device capable of dissipating sufficient heat to maintain a component to be heated at a desired temperature under stated ambient conditions, means for mounting said device in thermally conductive relationship with the component, said device being the principal heat source for heating the component, a sensor for producing an electrical signal indicative of the instantaneous temperature of the component, an amplifier for modulating said semiconductor device responsively to signals produced by said sensor, and a feed-back path between said semiconductor device and said amplifier for limiting the conduction of said device to a value safely within its capabilities.

2. A temperature control circuit as defined in claim 1 wherein said feed-back path includes a diode oriented to conduct the feed-back signals in its forward direction, whereby feed-back signals smaller than the forward breakdown voltage of said diode are not applied through said diode to said amplifier.

References Cited
UNITED STATES PATENTS

| | | | |
|---|---|---|---|
| 3,243,572 | 3/1966 | Vogt et al. | 219—210 |
| 3,300,623 | 1/1967 | Smyrnos | 219—501 |
| 3,330,941 | 7/1967 | Del Duca | 219—501 |

RICHARD M. WOOD, *Primary Examiner.*

C. L. ALBRITTON, *Assistant Examiner.*